Figure 1:
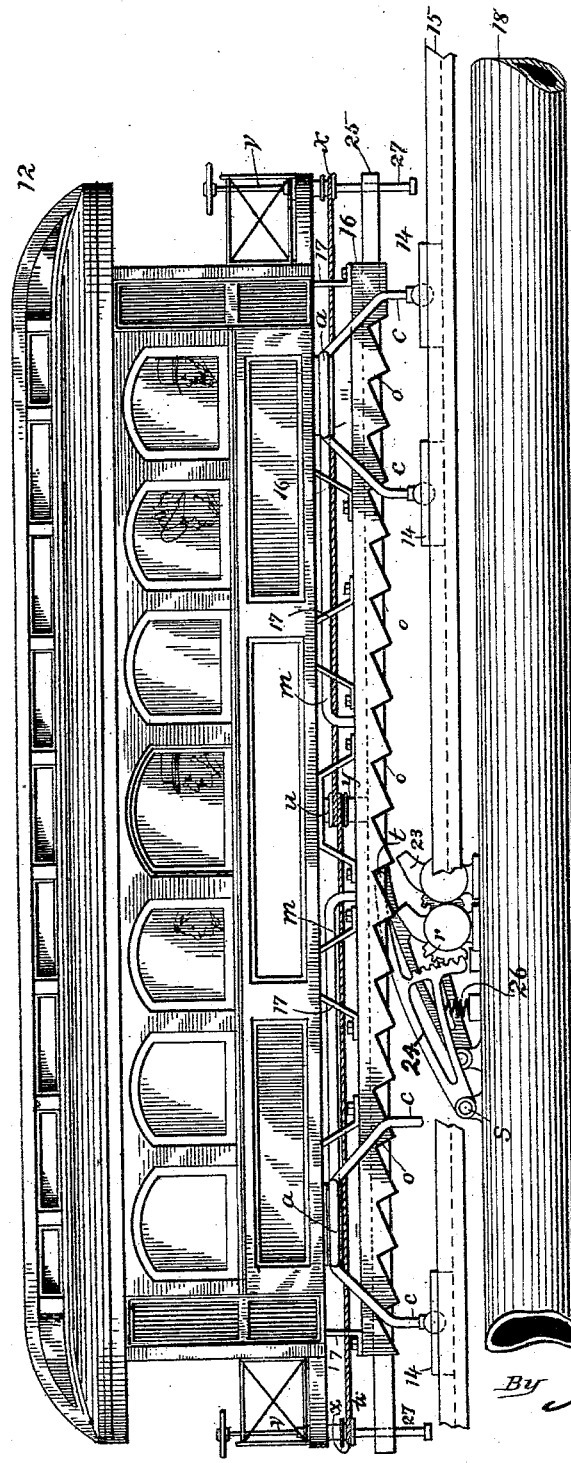

(No Model.) 7 Sheets—Sheet 1.

E. H. CRAW.
HYDRAULIC RAILWAY.

No. 425,408. Patented Apr. 15, 1890.

ATTEST:
J. A. Hurdle
Wm. H. Capes

INVENTOR:
Erastus H. Craw
By H. C. Townsend
Attorney

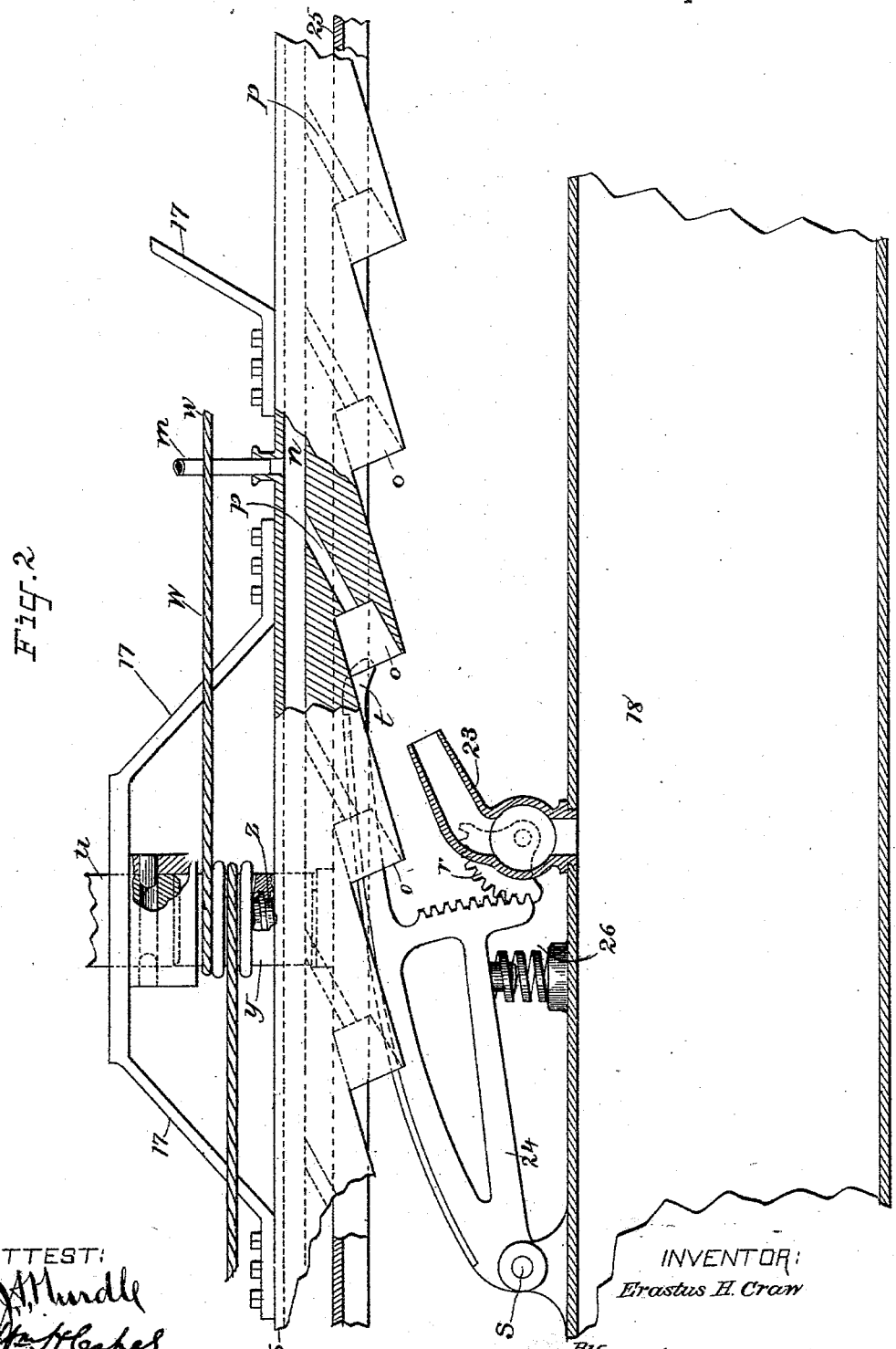

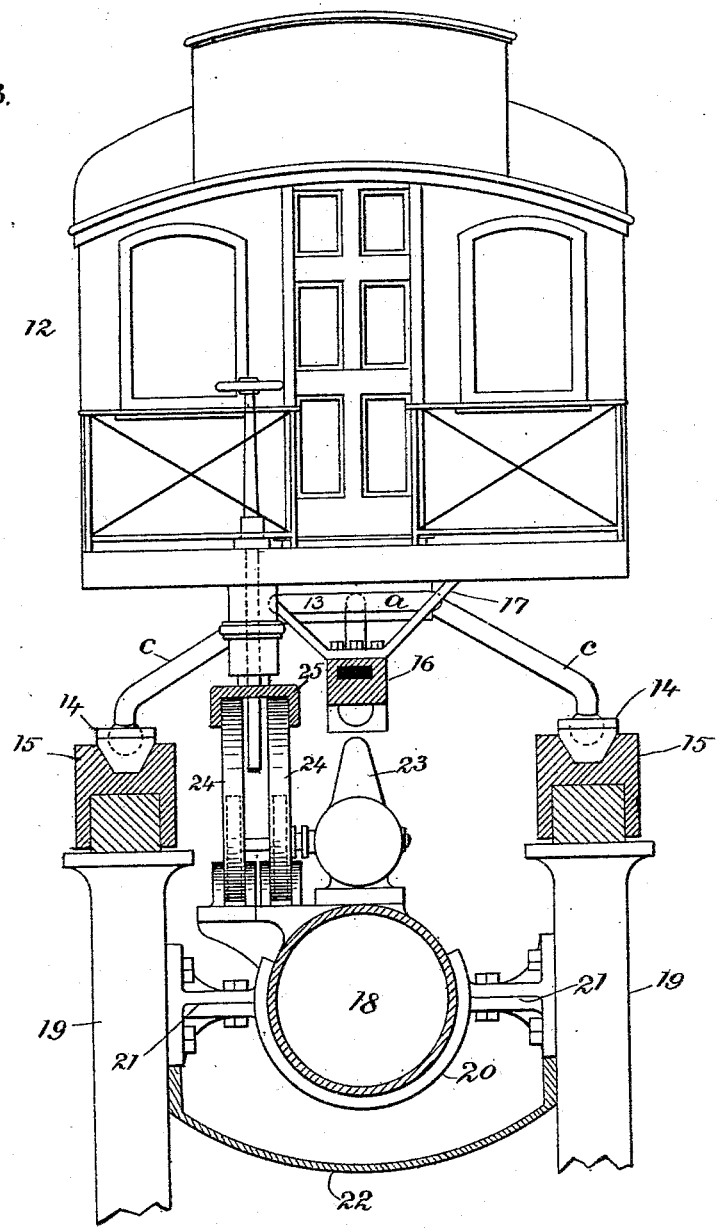

(No Model.)
7 Sheets—Sheet 4.
E. H. CRAW.
HYDRAULIC RAILWAY.
No. 425,408. Patented Apr. 15, 1890.
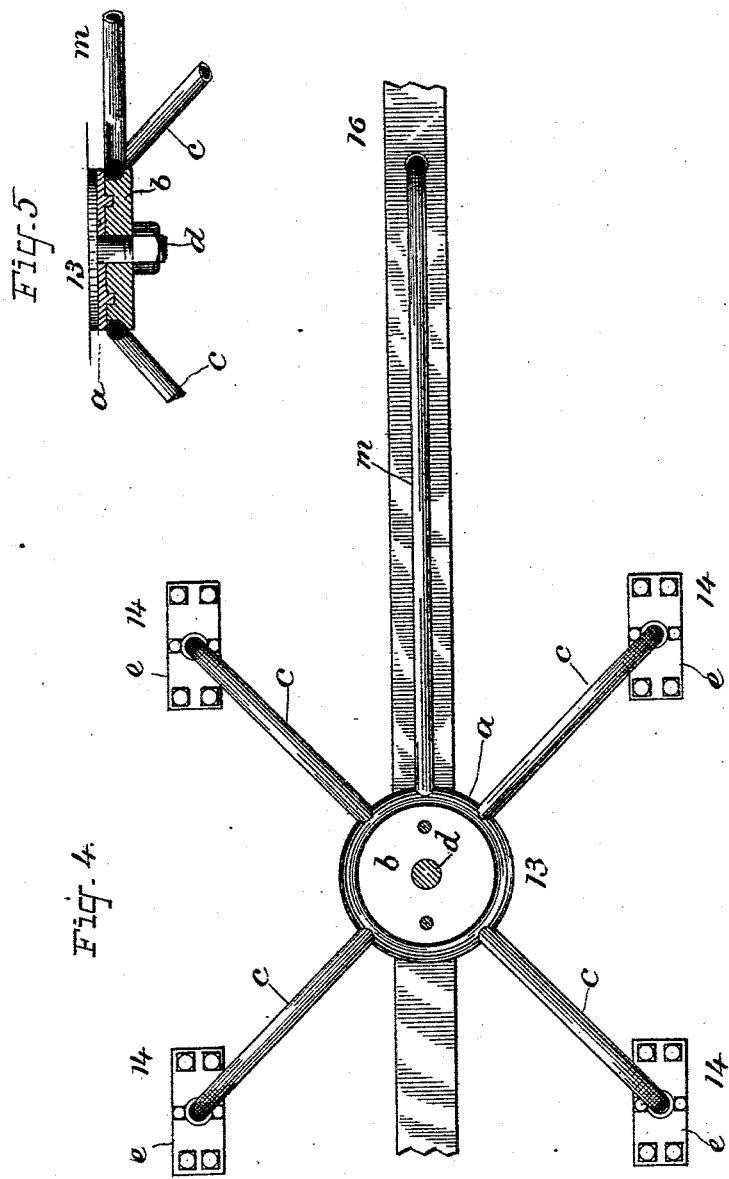
ATTEST:
J. Hurdle
Wm H. Capes
INVENTOR:
Erastus H Craw
By H. C. Townsend
Attorney (No Model.)  7 Sheets—Sheet 5.

E. H. CRAW.
HYDRAULIC RAILWAY.

No. 425,408.  Patented Apr. 15, 1890.

ATTEST:

INVENTOR:
Erastus H. Craw.

By H. C. Townsend
Attorney (No Model.) 7 Sheets—Sheet 6.
E. H. CRAW.
HYDRAULIC RAILWAY.
No. 425,408. Patented Apr. 15, 1890.
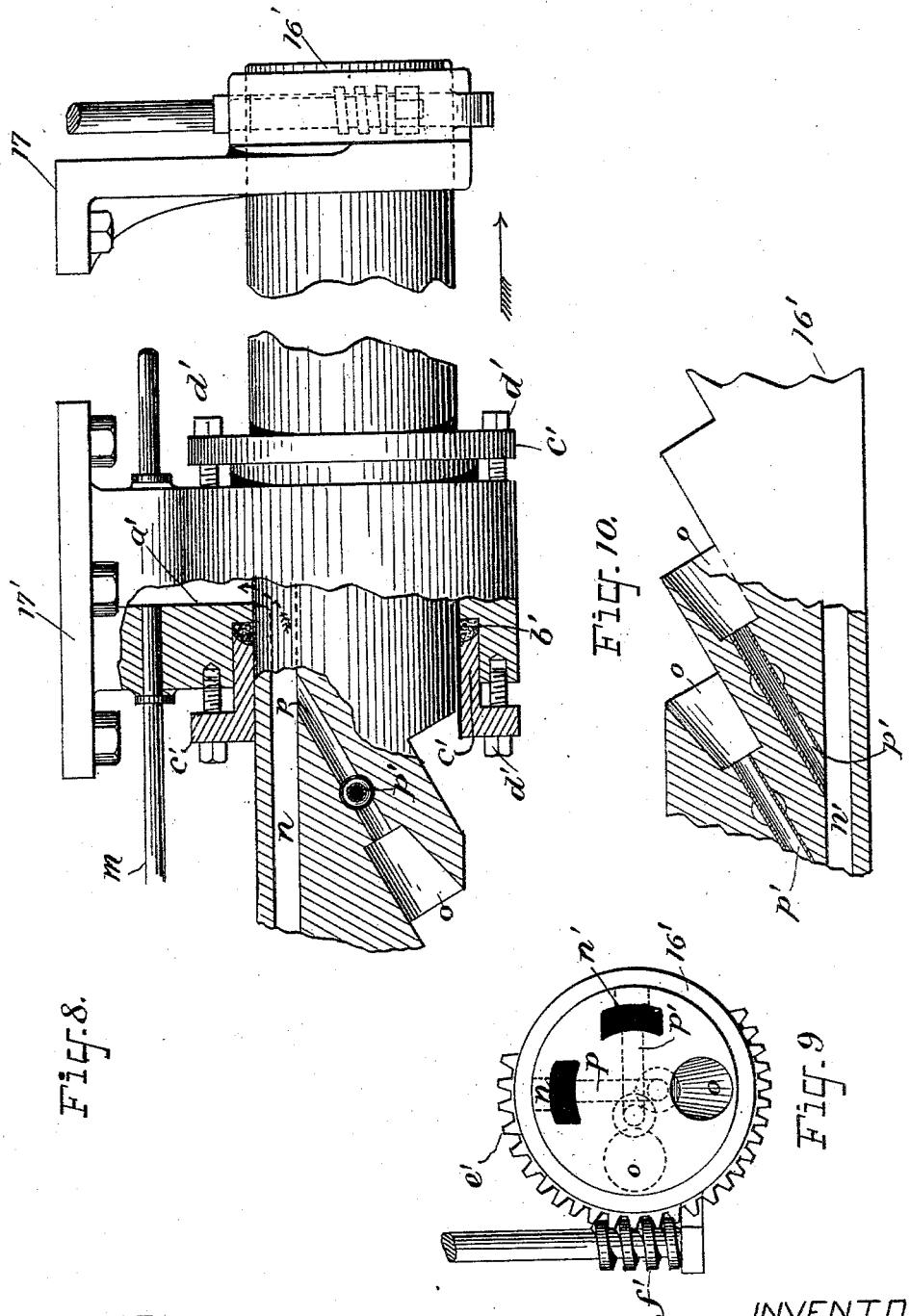
ATTEST:
J. H. Murdly
Thos. H. Capes
INVENTOR:
Erastus H. Craw
By H. L. Townsend
Attorney

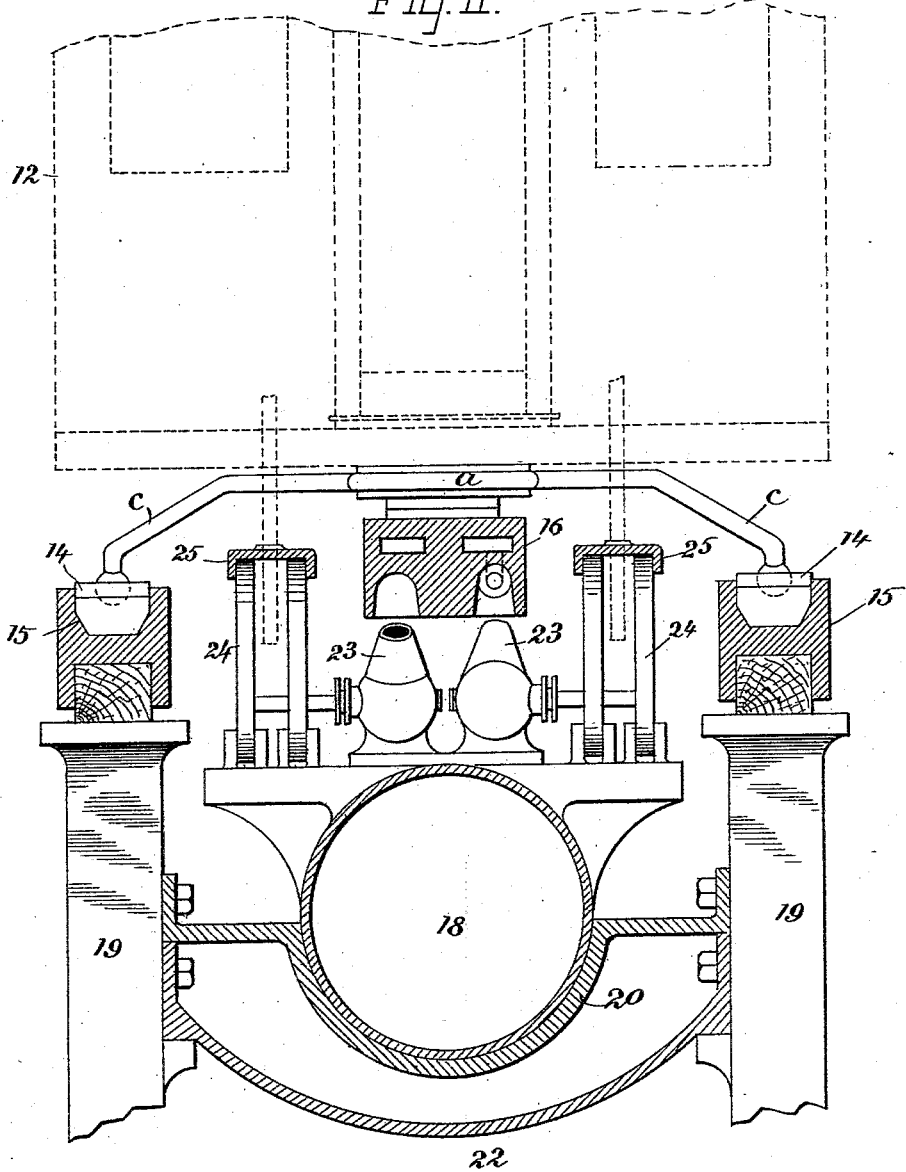

UNITED STATES PATENT OFFICE.

ERASTUS H. CRAW, OF NEW YORK, N. Y.

HYDRAULIC RAILWAY.

SPECIFICATION forming part of Letters Patent No. 425,408, dated April 15, 1890.

Application filed October 8, 1889. Serial No. 326,356. (No model.)

*To all whom it may concern:*

Be it known that I, ERASTUS H. CRAW, a citizen of the United States, and a resident of New York, in the county of New York and State of New York, have invented a certain new and useful Hydraulic Railway, of which the following is a specification.

My invention relates to the construction and operation of railways; and it has for its object the devising of a railway in which the motive power for driving the car or cars is water under pressure.

The cars are without wheels, and the way is specifically constructed to adapt it to cooperate with the wheelless car and its accessories and to enable the car to be supported when in motion and driven by hydraulic pressure, locomotives being entirely dispensed with in moving the cars, which is accomplished solely by water under pressure. The rails of special construction are supported above the surface of the road-bed on metal or masonry posts, and the car is supported on the rails on shoes of peculiar construction, which are secured to the ends of pipes forming a part of a hollow structure upon which the car is seated, and which is adapted to be supplied with water under pressure from a main located, preferably, between the posts or pillars of the way, and by means of which water the car is not only, through the instrumentality of the shoes referred to, supported on a film of water when moving, but is propelled over the rails on said fluid surface by the water issuing from nozzles with which the water-main is supplied at short intervals, and which are so constructed as to be adapted to open as the car passes over them and to close automatically when relieved from contact with the co-operating accessories fixed to the bottom of the car. As the car is water-borne, its friction is reduced materially and it is easily set in motion, and as it passes onto the nozzles the controlling-valves of the latter are opened, admitting streams of water, the water in the main to which the nozzles are affixed being under the requisite pressure, which are projected into or against that feature of the accessories connected to the bottom of the car adapted to receive them, thus accelerating the speed of the car and keeping the same in motion so long as the adjustment of the accessories at the bottom of the car is such as to permit of their coaction with the spring-controlled valves of the nozzles of the main. The mechanism by which the valves of the nozzles are opened by the car moving over them is so arranged at the bottom of the car as to be under the control of the brakeman, and by means hereinafter described it may be readily raised or lowered to start or stop the car.

To enable others interested in the art to construct and operate a railway embodying my invention, I will now describe the same more in detail in connection with the accompanying drawings, which form a part of this specification, and wherein like features are indicated by like figures of reference in the several views, and wherein—

Figure 7:
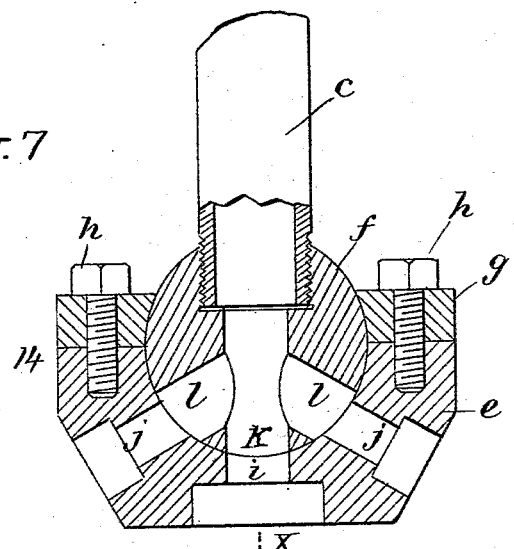
Figure 6:
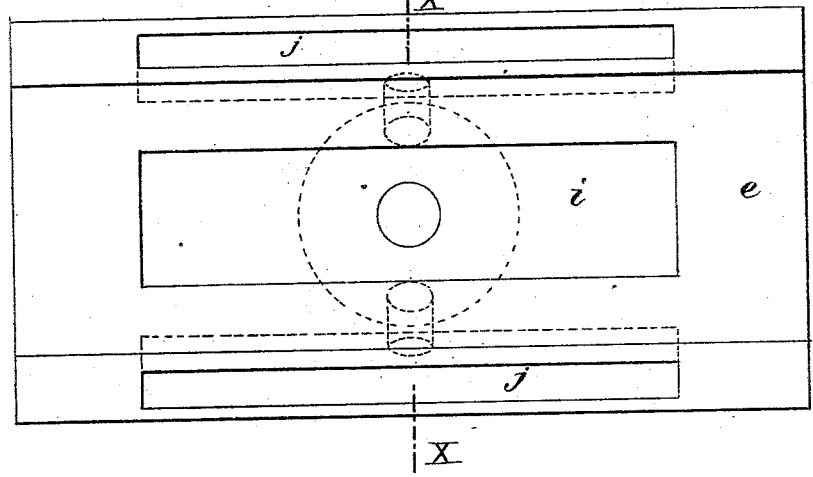

Figure 1 is a side elevation of a car equipped with certain features of my invention and in operative connection with certain features of the way. Fig. 2 is a side elevation, partly in section, of the accessories connected to the bottom of the car and of a portion of the water-main, showing one of the valved nozzles and its actuating-lever in position on the main. Fig. 3 is a rear end elevation of the car and its accessories supported upon the way, which is shown in cross-section, with certain features of the accessories of the car in cross-section. Fig. 4 is a top plan view of one of the hollow structures upon which the car is mounted, and which carries the shoes co-operating with the rails, and through which the water under pressure is conveyed to said shoes, this view also showing the connection of this structure with the frame, which is provided with the cups with which the valved nozzles of the water-main co-operate. Fig. 5 is a side elevation, partly in section, of a portion of the hollow structure shown in Fig. 4. Fig. 6 is a bottom plan view of one of the shoes which support the car on the rails. Fig. 7 is a central vertical section of said shoe on the line X X of Fig. 6. Fig. 8 is a side elevation, partly in section. Fig. 9 is a cross-section of Fig. 8, and Fig. 10 a fragmentary sectional plan of Fig. 8, these three views—8, 9, and 10—illustrating a modification of those features of the accessories secured to the bottom of the car with which the nozzles of the water-main coact, said modification illustrating means whereby the car is adapted to travel either end forward on the way; and Fig. 11 is a transverse section, partly in elevation, of a modification of the way and certain of the accessories of the car, showing duplication of the shoes of valved nozzles and their co-operating levers, the compression-bar, and the frame provided with the cups with which the valved nozzles co-operate. In this view the two sets of nozzles are arranged in the main so as to discharge the water in opposite directions, and the cups are likewise arranged in their frame in opposite directions, so that each set may readily receive the water from its respective set of nozzles. The duplication of the compression-bars enables each set of levers to be depressed independent of the other.

Referring to the drawings, the car, which is indicated by 12, may be of the usual construction, with the exception that, not being provided with wheels, it has none of the ordinary running-gear. To the bottom of the car there are bolted centrally one or more hollow structures, preferably of the form shown in Fig. 4 and which is indicated by 13. In Fig. 1 two of these structures 13 are shown applied to the car, and each consists of a circular central portion $a$, supported upon a block $b$, and a series—four in this instance—of depending branches $c$. This structure is secured to the bottom of the car by bolt $d$ or in any other suitable manner.

To the extremities of the four depending branches $c$ there are secured shoes 14. These shoes are constructed as shown in Figs. 6 and 7, wherein $e$ indicates the conformation of the socket member of the shoe, which rests within the depression in the top of the rail 15, as seen in Figs. 3 and 11; $f$, the ball member fitting into socket $e$, and having screwed therein the end of depending branch $c$ of the hollow structure 13, and $g$ the cap by which the ball and socket are held in operative relation to each other, the screw-bolts $h$ passing through said cap into the body of socket $e$. The socket $e$ is provided with a vertical channel $i$ and a series of lateral channels $j$, which communicate with the corresponding channels $k\ l$ of the ball $f$. By this construction the necessary flexibility of connection between the rails and the supported car is obtained and the car is adapted to be supported upon a film of water when moving. It will be noticed that the channels $l$ in the ball $f$ are somewhat larger in diameter than the entrance to the coincident channels $j$ in the socket, the purpose of which is to insure ample communication between the respective channels as the ball $f$ changes its position within the socket $e$ in the rolling or swerving of the car. The bottoms of channels $i\ j$ are enlarged, as shown in Fig. 7, for the purpose of increasing the water area in contact with the depression in the rail 14. Hollow structure 13 also communicates, by means of pipe $m$, with a frame 16, which is of the same length of the car, and is firmly fixed centrally to the bottom of the car by means of hangers 17. This frame is provided with a longitudinal channel $n$, closed at both ends and communicating with pipe $m$ of the hollow structure 13, as seen in Fig. 1, and it is also provided with a series of cup-shaped depressions $o$ on its under surface, which are arranged quite close together, as shown. Each of these cups $o$ communicates at its bottom with the channel $n$ by means of the channel $p$.

The water-main 18, of the required capacity, is arranged between the posts 19, which support the rails 15, as shown in Figs. 3 and 11. This main 18 is preferably supported in hangers 20, bolted to brackets 21, which in turn are bolted to pillars 19; or the hangers 20 may be bolted directly to the posts shown in Fig. 11.

Immediately below the brackets 21 there is arranged a trough 22, extending between the posts 19 and of the same length as the main 18, the object of which is to catch the water falling from cups $o$ and return it to the main 18, to be again used. The main 18 is fitted at frequent intervals with valve-nozzles 23, whose openings are so disposed to direct a stream of water issuing therefrom into the cups $o$ of the frame 16 as the car to which said frame is affixed moves over the rails. The valve of nozzle 23 is provided with a toothed plate $r$, adapted to engage with the teeth on the lever 24, as seen in Fig. 2. The lever is fulcrumed at $s$ to a bracket on the main 18, and its top surface is extended beyond the teeth of the lever in the form of a slightly-curved bar $t$, which operates between the flanges of the compression-bar 25, which is adapted to be raised or lowered to start or stop the car. Normally the valves of nozzle 23 are closed and the extension $t$ of the lever is elevated, the spring 26, which coacts with a stud on the valve-lever, as seen in Fig. 2, serving to maintain the parts in this condition. There will be employed as many of the nozzles 23 and their co-operating valve-levers 24 as are found desirable.

The compression-bar 25 is supported by the central post $u$, secured to the car, the ends of said bar being guided by the extensions 27 of the spindles $v$ of the mechanism for lowering and raising said compression-bar, which comprises, besides said spindles and their hand-wheels, the cable $w$, connected to the grooved portion $x$ on said extensions 27 and passing around grooves made in the sleeve $y$, swiveled to post $u$. The sleeve $y$ is screw-threaded interiorly and co-operates with the screw $z$, which is fixedly secured to the compression-bar 25. By this means the turning of the hand-wheels of the spindles $v$ will cause the compression-bar 25 to be lowered or raised by screw $z$ screwing out of or into the sleeve $y$. The screw $z$ is, as explained, fixed to the compression-bar 25 and does not revolve, while the sleeve $y$ is swiveled, as shown, to the stationary post $u$, and is revolved by the cable $w$, and hence the sleeve turns on the screw to depress or raise the compression-bar.

The construction and arrangement of frame 16, as above described, necessitates the reversal of the car at the end of the route, in order that the cups $o$ may present their openings rearward. To obviate the necessity of thus reversing the car is the purpose of the modified construction of the frame indicated by 16' and shown in Figs. 8 to 10. In these views the body of the frame 16' is circular, and it is supported centrally in position at the bottom of the car by the hangers 17, which encircle the frame 16', as seen in Fig. 8. The channel $n$ in frame 16' has an outlet at two or more points in the frame, between the ends of the latter, and at these points the hangers 17' are of special construction. The hanger 17' has a central channel $a'$, communicating with pipe $m$, for conveying the water to hollow structure 13, and also communicating with channel $n$ in the frame 16'. This frame is supported in this hanger 17', so that while the frame may turn in the hanger the joint between their respective surfaces is water-tight, in order that the water passing through the central channel $a'$ of the hanger may not escape. This water-tight joint is formed by the packing $b'$, gland $c'$, and set-screws $d'$.

As shown in Fig. 8, the frame 16' is in the position that it occupies when the car is moving in the direction indicated by the arrow. When the car has reached the end of the line and is shifted to the right-hand track for the return trip, to avoid the trouble of reversing the car, this modified frame 16' is so constructed and supported as to be capable of being turned in the hangers one-quarter of a revolution, so as to present a series of cups with their openings in a direction the reverse of that shown in Fig. 8. The internal construction of this modification of frame 16' is indicated in Fig. 9, wherein $n$ is the channel, $o$ the cup, and $p$ the passage between the cup and the channel $n$, (all of which is shown in Fig. 8,) and $n'$ is a channel corresponding to channel $n$ and formed in the frame near its circumference, about ninety degrees from the channel $n$. This channel $n'$ communicates with a series of pipes $p'$, which cross the channels $p$ and communicate with cups $o$, as seen in Fig. 10. The channel $p$ is provided with an enlargement at the points where pipes $p'$ cross it, in order that the water may pass around pipe $p'$ in its passage to the channel $n$ through channel $p$.

On the end or ends of frame 16', Figs. 8 and 9, there is fixed a flange or collar provided with gear-teeth $e'$, and on the end of hanger or hangers 17 there is formed a flange for supporting the screw $f'$, whose stem extends to the platform of the car, within easy reach of the conductor or guard, and which screw coacts with the teeth $e'$ for turning the frame 16'. By means of these devices the turning of the frame 16' within the hangers 17 and 17' may be easily accomplished, and to bring the series of cups opening in a direction opposite to those shown in Fig. 8 in a position to enable the car to be driven in the reverse direction, so as to avoid the necessity of turning the car on the track, it is only necessary to revolve the frame 16' one-quarter of a revolution, as will be obvious from an inspection of Fig. 9. It will of course be obvious that the nozzles 23, where double tracks are made use of, will be arranged to propel the car in one direction on one track and in the opposite direction on the other.

Fig. 11 illustrates another embodiment, whereby the car may be propelled in either direction on a single track. In this view there is shown a duplication of certain of the features of Fig. 3. The main 18 is provided with a double bracket, upon which is mounted a double series of nozzles 23, arranged to propel the car in either direction, and a double series of the co-operating lever mechanism. The frame 16 is in this embodiment of the construction shown in Fig. 2, but is doubled, as indicated, and there are employed two independent compressor-bars 25, which are operated to depress or release the levers 24 in the manner explained in describing the construction shown in Fig. 1. The trough 22, which extends the entire length of the track, serves to receive the water falling from the cups $o$ and to convey the same back to the main, so that it may be again used and not wasted.

The manner in which the car is propelled by the construction above described will be obvious to those familiar with the art. It will be observed that if the water in main 18 is under sufficient pressure, and this will be accomplished by the employment of pumps of the requisite capacity, and the valves of nozzles 23 are opened, which is effected by the lowering of compressor-bar 25 against the curved ends of levers 24, the water will be projected from said nozzles into the cups $o$ and forced into the hollow structure 13 to the shoes 14, where, being confined under pressure between the surfaces of said shoes and the walls of the depressions in the rails 15, it furnishes a fluid support for the car, upon which it is propelled by the force of the numerous streams of water projected into the cups which constitute fixtures of the car structure.

It will be readily understood that the details of construction herein described may be altered in several particulars without departing from the spirit of my invention. For example, the depressions into which the water from the nozzles is projected may be of different shape from that shown, and the arrangement of the channels within the frame provided with said depressions may be varied from that shown; also, the hollow structure need not be of the form illustrated, nor need its connection with the cup-frame be that which I have adopted as the preferred construction; also, other means may obviously be connected to the car for operating the levers of the valved nozzles than the compressor-bar which is herein described.

In the description I have described my invention as applied to a single car; but it is plain that it may be affixed to a train of cars as well.

Having thus described my invention, what I claim as new, and desire to secure by Letters Patent, is—

1. A railway-car supported upon the rails by a hollow structure constructed to receive and contain water under pressure which supports the car, in combination with a water-conduit provided with means whereby the water contained in said conduit may be discharged within and against said hollow structure, to supply the fluid surface upon which the car rests and the power for propelling the car, substantially as set forth.

2. A railway-car provided at its bottom with cup-shaped depressions which communicate with a hollow structure secured to the car, and which is provided with channeled shoes, in combination with rails having depressions in their top surfaces with which said shoes co-operate, and a main or other water-supply conduit provided with valved nozzles arranged to project streams of water into said cup-shaped depressions, substantially as set forth.

3. A railway-car provided at its bottom with cup-shaped depressions which communicate with a hollow structure secured to the car, and which is provided with channeled shoes, in combination with rails having depressions in their top surfaces with which said shoes co-operate, a main or other water-supply conduit provided with valved nozzles arranged to project streams of water into said cup-shaped depressions, and means suspended from the car whereby the valves of said nozzles may be opened by the movement of the car, substantially as set forth.

4. A railway-car provided at its bottom with a frame having cup-shaped depressions in communication with hollow structures which are provided with channeled shoes, in combination with a track having depressions in its rails, in which said channeled shoes rest, a water-conduit provided with valved nozzles, a corresponding number of valve-levers, and a compressor-bar supported at the bottom of the car, and mechanism for lowering and raising the compressor-bar to coact with said levers, substantially as set forth.

5. A railway-car having a frame secured to its bottom and provided with two series of cup-shaped depressions, and water-channels which communicate with said depressions and with hollow structures likewise secured to the bottom of the car and provided with channelled shoes, in combination with a track having depressions in its rails, in which said chaneled shoes rest, a water-conduit provided with valved nozzles, a corresponding number of levers, a compressor-bar supported at the bottom of the car and co-operating with said levers, and means whereby the said frame may be revolved to bring the cup-shaped depressions into proper positions to receive the streams of water when reversing the direction of the car, substantially as set forth.

6. A railway-car having a frame fixed to its bottom which is provided with cup-shaped depressions and with channels, as explained, and a hollow structure likewise fixed to the bottom of the car and in communication with the channels of said frame and embracing a series of depending pipes or hollow supports, to the ends of which are connected channeled shoes, in combination with railway-tracks having depressions in their tops with which said channeled shoes co-operate, and a water-main provided with a series of valved spring-controlled nozzles arranged to discharge streams of water into the cup-shaped depressions of said frame, substantially as set forth.

7. A railway-car having a frame fixed to its bottom which is provided with cup-shaped depressions and with channels, as explained, and a hollow structure likewise fixed to the bottom of the car and in communication with the channels of said frame and embracing a series of depending pipes or hollow supports, to the ends of which are connected channeled shoes, in combination with railway-tracks having depressions in their tops with which said channeled shoes co-operate, a water-main provided with valved spring-controlled nozzles arranged to discharge streams of water into the cup-depressions of said frame, and a compressor-bar supported at the bottom of the car on a screw-swivel and co-operating with the spindles $v$ and a connecting-cable $w$, substantially as set forth.

8. As a means for operating the valved nozzles of a hydraulic railway such as herein described, whereby the car may be started and stopped, a compressor-bar suspended from the bottom of the car and arranged to be lowered and elevated from the car-platform, in combination with a series of levers fulcrumed on the water-supply main in proximity to said nozzles, and each provided with teeth meshing with a toothed plate fixed to the spindle of the valve of the nozzle, and having a projecting arm co-operating with the compressor-bar, and a spring arranged beneath the lever and operating to normally keep the latter elevated, substantially as set forth.

9. The way of a hydraulic railway, consisting of rails supported on posts and provided with water-depressions in their top surfaces to support the shoes of the car, a water-main arranged between said posts and supported on hangers secured to the posts, and provided with a series of valved nozzles and with brackets supporting a corresponding series of spring-levers controlling the valves of said nozzles, substantially as set forth.

10. The shoe herein shown and described for supporting the car on the rails of a hydraulic railway, which consists of the oblong shell e, provided with a socket and with channels i j, and the ball f, fitting in said socket and provided with channels l l l and cap g, substantially as set forth.

11. A frame for attachment to the bottom of a car of a hydraulic railway for receiving the propelling-streams of water, which is circular in cross-section and is provided with two series of cup-shaped depressions, the two series having their openings in opposite directions and arranged about ninety degrees apart, and also provided with longitudinal channels n n', and conduits p p', communicating between the cup-shaped depressions and channels n n', in combination with the hangers 17 17', the latter provided with channel a', adapted to communicate with the channels n n' of the frame, a packing and packing-gland to prevent the escape of water between the frame and hanger 17', and gearing arranged on the hanger 17 and end of the frame, whereby said frame may be turned in the hangers, substantially as set forth.

12. The way of a hydraulic railway, consisting of rails supported on posts and provided with water-depressions in their top surfaces to support the shoes of the car, a water-main arranged between said posts and supported on hangers secured to the posts and provided with two series of valved nozzles, the two series having their outlets in opposite directions, and two series of spring-levers arranged on brackets on the main to control the valves of said nozzles, in combination with a pair of compressor-bars supported from the car and co-operating with the spring-controlled levers, and a frame fixed to the bottom of the car and provided with two series of cup-shaped depressions arranged to receive the streams of water from the said nozzles, substantially as set forth.

13. In a hydraulic railway, the combination, with the posts 19, and the valved main 18, supported on hangers 20, affixed to said posts, of the trough 22, supported on the posts beneath the main, substantially as and for the purpose set forth.

Signed at New York, in the county of New York and State of New York, this 2d day of October, A. D. 1889.

ERASTUS H. CRAW.

Witnesses:
WM. H. CAPEL,
HUGO KOELKER.